(12) United States Patent
Lynch et al.

(10) Patent No.: US 7,913,248 B1
(45) Date of Patent: Mar. 22, 2011

(54) SYSTEM AND METHOD FOR INSTALLING ONE OR MORE PROGRAMS, AND AT LEAST A PORTION OF THEIR ENVIRONMENT

(75) Inventors: Kevin Lynch, San Francisco, CA (US); Tracy Stampfli, San Francisco, CA (US); Peter Grandmaison, San Francisco, CA (US); Rebekah Hash, Los Angeles, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1379 days.

(21) Appl. No.: 11/089,699

(22) Filed: Mar. 25, 2005

Related U.S. Application Data

(60) Provisional application No. 60/556,721, filed on Mar. 26, 2004, provisional application No. 60/556,595, filed on Mar. 26, 2004, provisional application No. 60/556,966, filed on Mar. 26, 2004.

(51) Int. Cl.
*G06F 9/445* (2006.01)
(52) U.S. Cl. ......... 717/174; 717/168; 717/169; 717/175
(58) Field of Classification Search .......... 717/168–178; 709/203
See application file for complete search history.

(56) References Cited

U.S. PATENT DOCUMENTS

| | | | |
|---|---|---|---|
| 5,157,763 A | 10/1992 | Peters et al. | |
| 5,301,268 A | 4/1994 | Takeda | |
| 5,555,416 A | 9/1996 | Owens et al. | |
| 5,606,674 A | 2/1997 | Root | |
| 5,625,809 A | 4/1997 | Dysart et al. | |
| 5,694,563 A | 12/1997 | Belfiore et al. | |
| 5,781,192 A | 7/1998 | Kodimer | |
| 5,784,058 A | 7/1998 | LaStrange et al. | |
| 5,801,693 A | 9/1998 | Bailey | |
| 5,835,777 A | 11/1998 | Staelin | |
| 5,886,699 A | 3/1999 | Belfiore et al. | |
| 5,924,099 A | 7/1999 | Guzak et al. | |
| 5,999,740 A | 12/1999 | Rowley | |
| 6,009,274 A * | 12/1999 | Fletcher et al. | 717/173 |
| 6,028,965 A * | 2/2000 | Normile | 382/250 |
| 6,061,058 A | 5/2000 | Owens et al. | |
| 6,067,582 A | 5/2000 | Smith et al. | |
| 6,125,388 A | 9/2000 | Reisman | |
| 6,216,152 B1 * | 4/2001 | Wong et al. | 709/203 |
| 6,272,493 B1 | 8/2001 | Pasquali | |

(Continued)

FOREIGN PATENT DOCUMENTS

| | | |
|---|---|---|
| WO | WO 00/43913 | 7/2000 |
| WO | WO 00/49545 | 8/2000 |

OTHER PUBLICATIONS

Focus on HP OpenView, Nathan J. Muller, Mar. 1995, Chapters 8, 9 and 10.*

(Continued)

*Primary Examiner* — Lewis A Bullock, Jr.
*Assistant Examiner* — Michael Yaary
(74) *Attorney, Agent, or Firm* — Fish & Richardson P.C.

(57) ABSTRACT

A system and method installs a computer program, as well as the environment in which the computer program operates, if such environment is not already installed. The program as well as its environment are obtained via one or more servers and a computer network.

15 Claims, 4 Drawing Sheets

U.S. PATENT DOCUMENTS

| | | | |
|---|---|---|---|
| 6,314,565 B1 * | 11/2001 | Kenner et al. | 717/171 |
| 6,321,209 B1 | 11/2001 | Pasquali | |
| 6,378,128 B1 | 4/2002 | Edelstein et al. | |
| 6,418,555 B2 * | 7/2002 | Mohammed | 717/169 |
| 6,434,563 B1 | 8/2002 | Pasquali et al. | |
| 6,535,882 B2 | 3/2003 | Pasquali | |
| 6,539,539 B1 | 3/2003 | Larsen et al. | |
| 6,546,554 B1 | 4/2003 | Schmidt et al. | |
| 6,557,054 B2 | 4/2003 | Reisman | |
| 6,606,744 B1 * | 8/2003 | Mikurak | 717/174 |
| 6,636,856 B2 | 10/2003 | Pasquali | |
| 6,651,249 B2 | 11/2003 | Waldin et al. | |
| 6,654,765 B2 * | 11/2003 | Wong et al. | 707/103 R |
| 6,658,419 B2 | 12/2003 | Pasquali | |
| 6,687,745 B1 | 2/2004 | Franco et al. | |
| 6,748,591 B1 | 6/2004 | Lewallen | |
| 6,757,365 B1 | 6/2004 | Bogard | |
| 6,785,885 B2 * | 8/2004 | Norris et al. | 717/178 |
| 6,803,929 B2 | 10/2004 | Hinegardner et al. | |
| 6,839,714 B2 | 1/2005 | Wheeler et al. | |
| 6,874,142 B1 | 3/2005 | Ogura | |
| 6,904,569 B1 | 6/2005 | Anderson | |
| 6,944,821 B1 | 9/2005 | Bates et al. | |
| 6,961,907 B1 | 11/2005 | Bailey | |
| 7,080,139 B1 | 7/2006 | Briggs et al. | |
| 7,085,817 B1 | 8/2006 | Tock et al. | |
| 7,127,405 B1 | 10/2006 | Frank et al. | |
| 7,263,545 B2 | 8/2007 | Digate et al. | |
| 7,287,097 B1 * | 10/2007 | Friend et al. | 709/248 |
| 7,293,242 B2 | 11/2007 | Cossey | |
| 7,296,244 B2 | 11/2007 | Martinez et al. | |
| 7,299,259 B2 | 11/2007 | Petrovykh | |
| 7,305,453 B2 | 12/2007 | Awamoto et al. | |
| 7,310,781 B2 | 12/2007 | Chen et al. | |
| 7,337,210 B2 | 2/2008 | Barsness | |
| 7,370,278 B2 | 5/2008 | Malik | |
| 7,383,308 B1 | 6/2008 | Groves et al. | |
| 7,383,356 B2 * | 6/2008 | Gargi | 709/246 |
| 7,386,841 B2 | 6/2008 | Huang | |
| 7,395,500 B2 | 7/2008 | Whittle et al. | |
| 7,434,048 B1 | 10/2008 | Shapiro et al. | |
| 7,451,218 B2 | 11/2008 | Malik et al. | |
| 7,617,458 B1 | 11/2009 | Wassom et al. | |
| 2001/0034244 A1 | 10/2001 | Calder et al. | |
| 2002/0049633 A1 | 4/2002 | Pasquali | |
| 2002/0055975 A1 | 5/2002 | Petrovykh | |
| 2002/0069264 A1 | 6/2002 | Pasquali | |
| 2002/0080179 A1 | 6/2002 | Okabe et al. | |
| 2002/0103902 A1 | 8/2002 | Nagel et al. | |
| 2003/0050932 A1 | 3/2003 | Pace et al. | |
| 2003/0208491 A1 | 11/2003 | Pasquali | |
| 2004/0093563 A1 | 5/2004 | Pasquali | |
| 2004/0111478 A1 | 6/2004 | Gross et al. | |
| 2004/0143633 A1 | 7/2004 | McCarty | |
| 2004/0205134 A1 | 10/2004 | Teven et al. | |
| 2004/0230967 A1 | 11/2004 | Yuknewicz et al. | |
| 2005/0021652 A1 | 1/2005 | McCormack | |
| 2005/0049960 A1 | 3/2005 | Yeager | |
| 2005/0066019 A1 | 3/2005 | Egan et al. | |
| 2005/0086290 A1 | 4/2005 | Joyce et al. | |
| 2005/0086640 A1 * | 4/2005 | Kolehmainen et al. | 717/120 |
| 2005/0097061 A1 | 5/2005 | Shapiro et al. | |
| 2005/0172241 A1 | 8/2005 | Daniels et al. | |
| 2005/0198581 A1 | 9/2005 | Soderberg et al. | |
| 2005/0203892 A1 | 9/2005 | Wesley et al. | |
| 2005/0210401 A1 | 9/2005 | Ketola et al. | |
| 2005/0257128 A1 | 11/2005 | Pasquali et al. | |
| 2005/0262521 A1 | 11/2005 | Kesavarapu | |
| 2006/0025091 A1 | 2/2006 | Buford | |
| 2006/0085796 A1 | 4/2006 | Hoerle et al. | |
| 2006/0095524 A1 | 5/2006 | Kay et al. | |
| 2006/0271526 A1 | 11/2006 | Charnock et al. | |

OTHER PUBLICATIONS

RealPresenter Plug-in, User's Guide Version 5.0, Real NetworksInc, 1998, 29 pages.*

Netscape 7.1 Upgrade Guide, 8 pages 2003.*

Lambert, Karine, Authorized Officer, European Patent Office, in International Search Report for Application Serial No. PCT/US2008/066184, mailed Nov. 6, 2008, 15 pages, to be published by USPTO.

Lambert, Karine, Authorized Officer, European Patent Office, in International Search Report for Application Serial No. PCT/US2008/066188, mailed Nov. 6, 2008, 15 pages, to be published by USPTO.

Sun Microsystems, Inc., Java™ Network Launching Protocol & API Specification (JSR-56) Version 1.5 [Online] May 2001, XP007906066. Retrieved from the Internet: URL:http://cds.sun.com/is-bin/INTERSHOP.enfinity/WFS/CDS-CDS_Developer-Site/en_US/-/USD/VerifyItem-Start/jnlp-1_5-mr-spec.pdf?BundledLineItemUUID=gvVIBe.DpoAAAEdPRliMS9Y&OrderID=0Q51Be.pB81AAAEdMBliMS9Y&ProductID=fL_ACUFB1v0AAAEY2U45AXuV&FileName=/jnlp-1_5-mr-spec.pdf>(Retrieved on Nov. 24, 2008), pp. 1-85.

Sun Microsystems, Inc., "Auto Downloading JREs using Java™ Web Start and Java™ Plug-in" [Online] Feb. 2007, pp. 1-3, XP007906067. Retrieved from the Internet: URL:http://web.archive.org/web/20070207051627/http://java.sun.com/j2se/1.5.0idocs/guide/javaws/developersguide/autod1.03.06.html>(Retrieved on Nov. 28, 2004).

Sun Microsystems, Inc., Packaging JNLP Applications in a Web Archive, Java™ Web Start 1.4.2 [Online] Aug. 2005, pp. 1-11, XP007906068. Retrieved from the Internet: URL:http://web.archive.org/web/20050828081147/http://java.sun.com/j2se/1.4.2/dosc/guide/jws/downloadservletguide.html>(Retrieved on Nov. 24, 2008).

Corporate Portals Letter, vol. 1, No. 10, Oct. 2000.

Phillip J. Windley, "REST: Representational State Transfer," Chapter 11, Mar. 22, 2005, pp. 237-261.

Office Action, U.S. Appl. No. 11/090,402 mailed Nov. 19, 2007, 9 pages.

Final Office Action, U.S. Appl. No. 11/090,402 mailed Jul. 22, 2008, 18 pages.

Office Action, U.S. Appl. No. 11/090,402 mailed Jan. 9, 2009, 18 pages.

Office Action, U.S. Appl. No. 11/090,741 mailed Aug. 28, 2008, 26 pages.

Final Office Action, U.S. Appl. No. 11/090,741 mailed Mar. 6, 2009, 40 pages.

Office Action, U.S. Appl. No. 11/280,714 mailed Jun. 11, 2009, 27 pages.

Office Action, U.S. Appl. No. 11/282,916 mailed Jan. 28, 2009, 15 pages.

Final Office Action, U.S. Appl. No. 11/282,916 mailed Jul. 9, 2009, 26 pages.

Office Action, U.S. Appl. No. 11/282,217 mailed Feb. 5, 2009, 16 pages.

Kolehmainen et al., U.S. Appl. No. 60/513,050, titled: Systems and Methods for Facilitating Software Development and Communications Efficacy, filed Oct. 21, 2003.

U.S. Appl. No, 11/282,916, filed Nov. 18, 2005, Office Action dated Jul. 9, 2009, to be published by the USPTO, 26 pages.

U.S. Appl. No. 11/282,217, filed Nov. 18, 2005, Office Action dated Aug. 5, 2009, to be published by the USPTO, 19 pages.

U.S. Appl. No. 11/280,714, filed Nov. 15, 2005, Office Action dated Dec. 24, 2009, to be published by the USPTO, 34 pages.

U.S. Appl. No. 11/090,741, Non-Final Office Action dated Jan. 7, 2010, 51 pages.

U.S. Appl. No. 11/282,217, Non-Final Office Action dated Jan. 4, 2010, 20 pages.

U.S. Appl. No. 11/090,741, Non-Final Office Action dated Jun. 11, 2010, to be published by the United States Patent and Trademark Office, 47 pages.

U.S. Appl. No. 11/090,741, Filed Mar. 25, 2005, in Office Action, mailed Aug. 6, 2009, 40 pages.

U.S. Patent Office, U.S. Appl. No. 11/875,764, Filed Oct. 19, 2007, in Office Action Sep. 1, 2010, 7 pages.

* cited by examiner

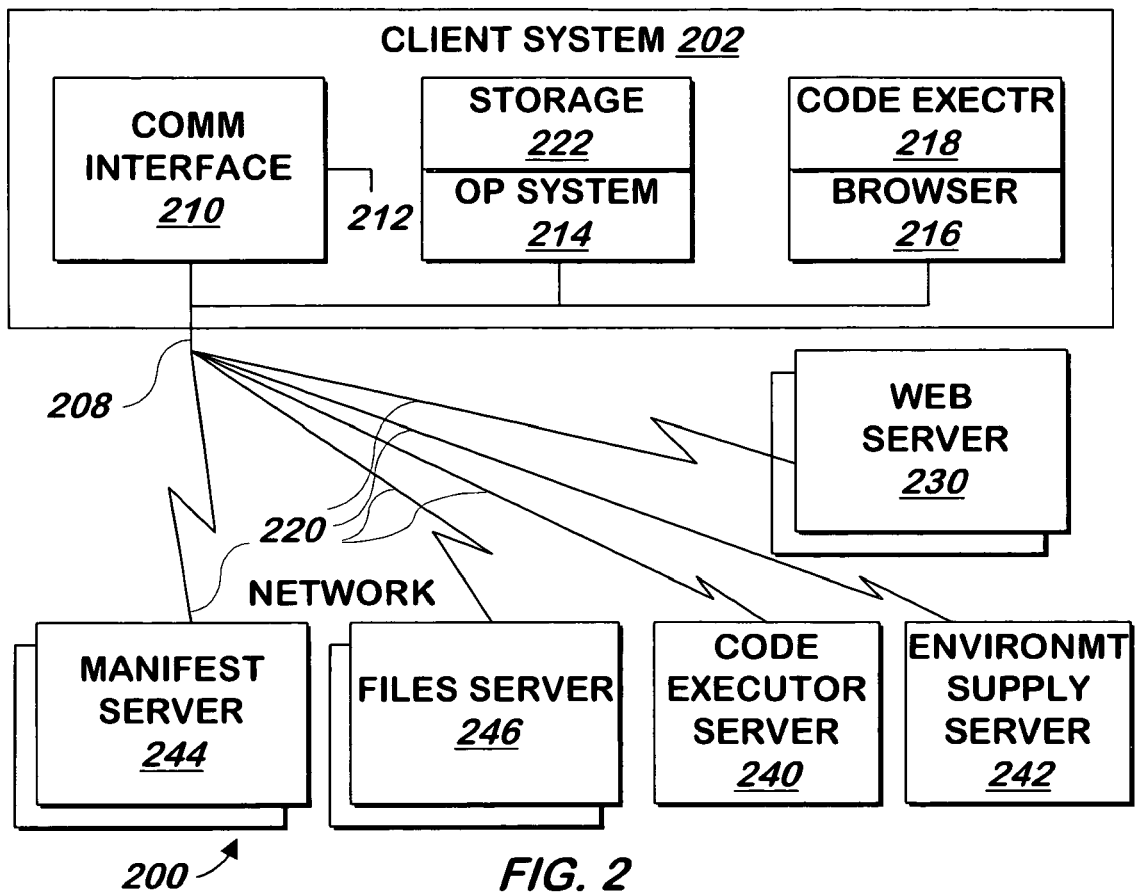
FIG. 2
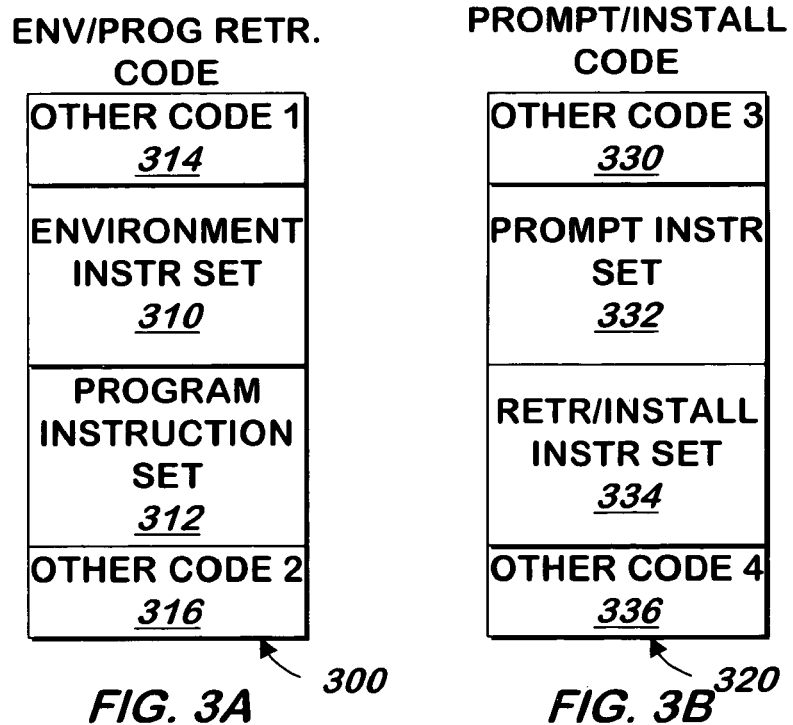
FIG. 3A
FIG. 3B

SYSTEM AND METHOD FOR INSTALLING ONE OR MORE PROGRAMS, AND AT LEAST A PORTION OF THEIR ENVIRONMENT

RELATED APPLICATIONS

This application is related to U.S. application Ser. No. 11/090,402 entitled, "System and Method for Communicating Information Over a Network" filed on Mar. 25, 2005 by Kevin Lynch, David Calaprice, Ethan Malasky and Tracy Stampfli; application Ser. No. 11/090,741 entitled, "System and Method for Updating One or More Programs and Their Environment" filed on Mar. 25, 2005 by Tracy Stampfli and Rebekah Hash, each having the same assignee as this application and each is incorporated herein by reference in its entirety.

FIELD OF THE INVENTION

The present invention is related to computer software, and more specifically to computer software for installing programs over a network.

BACKGROUND OF THE INVENTION

Computer software may provide productivity or other benefits to a user of the computer software. However, potential users of computer software may be reluctant to use, or even try, computer software because of the overhead involved in the acquisition of the computer software. Users who could benefit from the productivity enhancements or other benefits of the software do not receive them, because they may be reluctant to overcome the hurdles involved in acquiring new software.

One such hurdle is the installation process itself. Many computer programs require the user to perform a complicated installation process before the software can be installed. If the computer software only runs in an environment that is not installed on the potential user's computer system, the potential user must locate the environment, install it, and then install the computer software. For example, if a user does not have the proper operating system that is a prerequisite of the latest software application, the user must locate the operating system, install it, and then install the new computer software. Installing the environment and/or the software can require the user to perform multiple steps, such as downloading the software to a location, remembering the location at which the software was downloaded, running the software, and then answering a number of questions about how and where to install the software. All of this can be a significant inconvenience to the user, and the user may simply abandon efforts to obtain the benefits originally-desired computer of the software when confronted with these issues. The problem becomes even greater when the user considers that the investment in time and energy to install the software and its environment are very real, but the potential benefits to be obtained are unproven and might not ever be realized by that user.

In some cases, the mere determination as to whether the potential user's computer system has the proper environment required by the computer software may itself represent overhead to the installation process that is sufficient to cause the user to avoid installing new software. For example, if the computer software requires a particular minimum processor speed to operate, the potential user may not know whether his or her computer system has a processor operating at that speed, or the equivalent processor. The identification as to whether the potential user's computer system has the minimum required environment may be more trouble than the user is willing to undergo to attempt to obtain the as yet unproven benefits promised by the software. The potential user may not even have any idea how to go about making the determination as to whether his or her computer system meets the minimum requirements of the software, and this problem can act as a further obstacle to installing the software.

Still another obstacle may be the problem of locating a place to purchase or license the software. A potential user may read about the software on the manufacturer's web site, but the manufacturer may not sell or license the software from that web site, requiring the user to search around for a retailer of that software.

Additionally, the user may be reluctant to pay the cost of the software. The cost of the software may include markups from each of a distributor and the retailer, which make the price of the software more expensive than the user can justify paying for software whose benefits to the user are not proven. If the software is not available in a retail store the user trusts, the user may be reluctant to purchase, license or otherwise obtain the software from an otherwise unknown and un-trusted Web site.

Because of the time and trouble and the involved in performing these activities, and the perceived risk of using an unknown source, a user may be extremely reluctant to install software whose benefits are unproven. As a result, many potential benefits of computer software are never achieved because the potential user is reluctant to go through the overhead of the installation process.

The overhead for the user is not the only reason that some software is not distributed. There is also overhead on the part of the software developer that can prevent some software from ever being made available in the first place. A new software manufacturer is required to set up an infrastructure for distribution (including packaging design, manufacturing, retailing and distribution agreements and other overhead) that may be too much effort for the developer of a niche application or one for which there is uncertain demand. The developer could attempt to market it from a web site, but the effort involved in directing sufficient customer traffic to the web site could be too expensive (e.g. due to advertising and public relations costs) to make the effort worthwhile, particularly for a new software developer. Furthermore, the software developer might be required to assist potential users with the installation process, including the determination as to whether the potential user's computer system contains the proper environment for the computer software. All of this overhead can prevent software that can provide benefits to a user from ever being developed in the first place.

What is needed is a system and method for distributing software that can identify whether a potential user's computer system contains the proper environment for the software, can automatically install the proper environment on the user's computer system if it does not have it, can automatically install the software for the user once the user's system contains the proper environment, and can direct potential customers to obtain the product in a manner that potential users trust, without requiring the developer to employ a distributor and retailer and their corresponding markups, while reducing the support the developer is required to provide to potential users of the computer software.

SUMMARY OF INVENTION

A system and method detects whether a user's computer system has the environment required to run a program desired by the user, and if not, obtains and installs the environment. The system and method obtains the program and installs it. The system and method can list the programs available for the environment and allow the user to obtain and install any such program from within the environment, increasing the chance that the user will trust the process, and without requiring a separate retail distribution process.

BRIEF DESCRIPTION OF THE DRAWINGS

FIG. 2 is a block schematic diagram of a system for installing a computer program and optionally, its environment according to one embodiment of the present invention.

FIG. 3A is a block diagram of a file retrieved from the web server 230 of FIG. 2 according to one embodiment of the present invention.

FIG. 3B is a block diagram of a file retrieved from the environment supply server 242 of FIG. 2 according to one embodiment of the present invention.

DETAILED DESCRIPTION OF A PREFERRED EMBODIMENT

Figure 1:
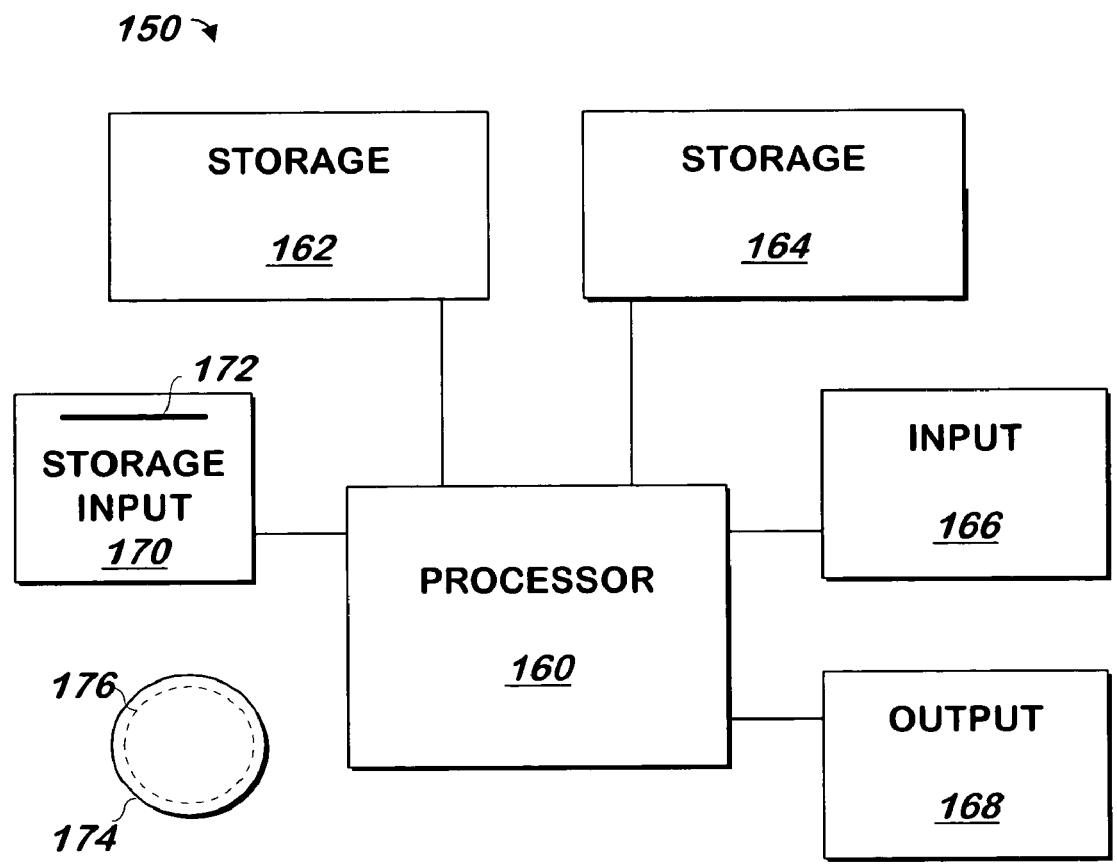
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Referring now to FIG. 2, a system 200 for installing a computer program and optionally, its environment, is shown according to one embodiment of the present invention. System 200 includes client computer system 202, network 220, and some or all of servers 230-246

Client computer system 202 is a conventional computer system, such as a personal computer, mobile telephone, PDA or other computing device such as was described above with respect to FIG. 1. When a user wishes to install a computer program on client computer system 202, the user navigates to a manufacturer web site using browser 216 coupled via operating system 214 to a conventional set of a keyboard, mouse and monitor or other similar device via input/output 212 of communication interface 210, which has a suitable interface. The user navigates browser 216 by designating an address of web server 230 to browser 216, either by typing it into an address input box or clicking a link. Browser 216 sets up a communication session with web server 230 by providing a request to communication interface 210 via operating system 214, and communication 210 formats and transmits the request to web server 230 via network 220.

In one embodiment, all communication into or out of client computer system 202 over network 220 is made via input/output 208 of communication interface 210. Communication interface 210 is coupled via input/output 208 to network 220, which may be any conventional networks such as the Internet or a local area network or both. In one embodiment, communication interface 210 is a conventional communication interface that supports Ethernet, TCP/IP and/or other conventional communication protocols.

Communication interface 210 sends the request to web server 230, which may be any conventional web server. Web server 230 sends a response that contains a web page file. Communication interface 210 provides the web page file to browser 216, which stores the web page file into storage 222 via operating system 214. All files retrieved as described herein may be stored into storage 222, which may be memory or disk storage as described above.

In one embodiment, the web page file includes or references a file containing computer code, and browser 216 also retrieves and stores this file into storage 222. The file containing computer code may include a conventional Flash movie file specified by Macromedia, Inc., at the web site, Macromedia.com and such specification is incorporated by reference in its entirety. Although a Flash movie file is used herein, any computer code that can cause a computer system to perform the functions described herein may be used according to the present invention. (It is noted that, in spite of the fact that the file is referred to as containing computer code, other files described herein also contain computer code.)

In one embodiment, this additional file containing computer code has a type that may be represented by the extension of the filename of the file, and browser 216 attempts to locate a plug in to the browser that is registered for the type of the file. If it does not locate the file, browser 216 requests it from code executor server 240. In the case of a Flash movie file, the plug in is the Flash Player product commercially available from Macromedia, Inc., of San Francisco, Calif. Code executor server 240 supplies a code executor 218, which may be a plug in to browser 216 or another product that is capable of executing code in the file containing computer code as described herein, such as the Flash Player product described at Macromedia.com, and such description is hereby incorporated by reference in its entirety. Code executor 218 installs itself, by registering to operating system 214, browser 216, or both, and one or both of these 214, 216 associate code executor 218 with one or more types of files that code executor 218 identifies as being of any number of one or more types it is able to process. Although code executor 218 is described herein as a plug in to a browser, other items that can execute code as described herein may be used by the present invention.

Because the web page received from web server 230 contains the file containing computer code having a name corresponding to the type registered by code executor 218, browser 216 causes the file containing the computer code to be executed by code executor 218. In one embodiment, the computer code is Flash action script and other Flash movie code that is described in the help files of the Flash MX 2004 authoring tool, and such description is hereby incorporated by reference in its entirety.

The file containing computer code and retrieved from web server 230 is shown in FIG. 3A in one embodiment of the present invention. Referring now to FIGS. 2 and 3A, file 300 may contain environment instruction set 310, program instruction set 312, each described below, as well as other code 314, 316 that perform other functions. File 300 may be a Flash movie file in the .swf format described at Macromedia.com and such description is hereby incorporated by reference in its entirety.

In one embodiment, other code 314 directs code executor 218 to check if code executor 218 itself is at least at a version specified in other code 314. If not, other code 314 directs code executor 218 to instruct the user that a newer version of code executor 218 is available and asks if the user wishes to retrieve it. If the user assents, other code 314 directs code executor 218 to download the latest version of code executor 218 and install it. Code executor 218 performs such instructions by downloading the latest version from code executor server 240 and registers it to browser 216, operating system 214, or both and may prompt the user to restart browser 216 or client computer system 202. If the user assents to the prompt, code executor 218 directs operating system 214 to restart browser 216 or client computer system 202 and operating system 214 complies. The user may then begin the process of retrieving the web page again. This time, code executor will be the correct version.

In one embodiment, environment instruction set 310 contains one or more instructions that instruct code executor 218 to check client computer system 202 for the proper environment and install it if necessary. Exhibit A illustrates representative code for checking to see if the Central product is installed and if not, to install it. Exhibit A also contains code and instructions regarding the monitoring, of the installation process. More detail on coding for Central may be found at macromedia.com/devnet/central/ on the World Wide Web. In one embodiment, the program is a program that runs under the Central environment commercially available from Macromedia, Inc. and described at the web site of Macromedia.com and the environment is a version, or the latest version, of the Central product commercially available from Macromedia, Inc. An environment according to the present invention may include any one or more computer hardware or software product in other embodiments. The specifications of the proper environment may be provided in environment instruction set 310 or may be inherent in it. For example, Central may always be the environment.

In response to the instructions in environment instruction set 310, code executor 218 scans client computer system 202 for the proper environment using conventional hardware and/or software discovery techniques. For example, to determine whether the Central product is installed, code executor 218 queries operating system 214 to identify whether one or more files corresponding to the Central product or other environment have been stored in a subdirectory in which such files would have been stored if the product was installed.

If code executor 218 determines that the proper environment is installed on client computer system 202, code executor 218 executes program instruction set 312 in the file 300 it is executing. Otherwise, before executing program instruction set 312, and under the directions set forth in environment instruction set 310, code executor 218 retrieves (or orders) the proper environment via network 220, downloads it, and installs it as will now be described.

In one embodiment, to retrieve the proper environment, code executor 218 retrieves from environment supply server 242 the file shown in FIG. 3B. Although this file is described as a single file, it may be multiple files or a part of another file, such as file 300. Referring now to FIGS. 2, 3A and 3B, the file 320 of FIG. 3B is shown according to one embodiment of the present invention. Code executor 218 obtains the address of environment supply server 242 either internally within code executor 218 (to ensure that a malicious supplier of environment instruction set 310 does not supply a rogue environment) or from environment instruction set 310 described above, and requests the file 320 via communication interface 210 and optionally, via browser 216.

File 320 contains code in a set of one or more instructions 332 describing a user interface, or the user interface strings that can be used in a predefined user interface that code executor 218 contains internally, or retrieves from code executor server 240, or environment supply server 242 in response to a command in instructions 332, that informs the user that the environment is required to install the software and prompts the user for permission to install it. The user interface may contain user interface elements such as text messages, push buttons and the like, as well as code that can be executed by code executor 218, for example, all in the form of a Flash movie or Flash movie clip. Code executor 218 executes the code and displays the user interface, which may contain a push button to allow the user to indicate agreement to install the environment. If the user so indicates using the user interface displayed, code executor 218 executes the one or more instructions in retrieve/install instruction set 334 that instruct code executor 218 to retrieve the environment or those portions of the environment that may have been identified when code executor 218 scanned client computer system 202. (File 320 may contain other code 330, 336 in addition to the sets 332, 334 described herein)

Code executor 218 obtains the environment or portion thereof from environment supply server 242, and installs the environment, for all, or any portion, of the environment that is software. The location of the environment may be specified in file 300 or file 320, or it may be specified internally as part of code executor 218.

If hardware is necessary for the proper environment, in one embodiment, code executor 218 may order it from environment supply server 242 for delivery to the user, and provide instructions for its installation into client computer system 202.

Once the proper environment has been installed, code executor 218 may attempt to redetect the environment to confirm that the proper environment has been installed by reexecuting some or all of environment instruction set 310 or it may skip such redetection. If the proper environment has been installed, code executor 218 executes instruction set 312.

In one embodiment, the proper environment consists of any or all of a boot loader, master controller, agent manager, application manager and console manager described in one of the related applications. These items together are included as the conventional Central product commercially available from Macromedia.com, although other environments may be used according to the present invention.

Instruction set 312 contains one or more instructions that instruct code executor 218 to obtain the program that was initially desired by the user. In one embodiment, the program consists of any or all of an agent, an application and one or more pods as described in the related application. Each of these items may consist of one or more files or a portion of a file, and all files are specified by a manifest, having an address on manifest server 244 specified by program retrieval instruction set 312.

Code executor 218 retrieves the manifest from manifest server 244 via communication interface 210, network 220, and optionally, browser 216 as specified by program retrieval instruction set 312. In one embodiment, the manifest is an XML file that specifies the location of the one or more files of the program.

Code executor 218, under direction of program retrieval instruction set 312, then parses the manifest to identify the location of the one or more files that make up the program. In one embodiment, the files for a given program are located on one or more files server 246 that is different from manifest server 244, however, in another embodiment, files server 246 and manifest server 244 are the same set of one or more servers. In one embodiment, for security purposes, code executor 218 enforces a rule that requires the manifest and all files for the corresponding program to come from a single internet domain to ensure that a third party does not alter the manifest to cause unauthorized files to be retrieved and installed. Under the direction of program retrieval instruction set 312, code executor 218 retrieves the one or more files into storage. 222, and then installs the program corresponding to the files. In one embodiment, installing the program involves copying or logically moving (by renaming) the some or all of the files for the program retrieved from files server 246 to a location on storage 222 that the environment described above can access, although other embodiments may involve other conventional file installation activities, such as decompressing them or registering them via a registry.

Under control of program retrieval instruction set 312, code executor 218 then executes or directs operating system 214 to execute, the program installed using the environment. In one embodiment, the program is one or more Flash movies executed by the agent manager, application shell manager and console manager, (each including a Flash movie player, modified as described in the related application, and its related Flash movie), operating under the direction of a master controller (which includes a Flash movie player and its related Flash movie) as described in the related applications. Execution of the program may be performed by directing operating system to run a boot loader described in the related application, and providing the name or other identifier of the program to the boot loader. The boot loader provides the name or other identifier of the program to the master controller, which causes the program to be executed as described in the related application.

Servers 230-246 may include any number conventional web servers, and some servers 230-246 may be shared.

Servers 230, 244, 246 may be operated by, or on behalf of, the same commercial entity, but one that is different from the one or more commercial entities that operate servers 240, 242, or on whose behalf such servers 240, 242 are operated. In one embodiment different programs may be retrieved from different manifest servers 244 and different files servers 246. Different web servers 230 may be used to initiate the process for different programs. Although two of each such servers 230, 244, 246 are shown in the figure, any number of sets of such servers 230, 244, 246, may be used, and as noted above each set of servers 230, 244, 246 may be combined to a fewer number of servers.

It is noted that the only user intervention involved is the request for the original web page and an optional confirmation to install the environment if it is not already installed. All of the other steps can occur without user intervention, although additional user intervention steps may be involved at any point in the process.

In one embodiment, certain programs are installed with the environment. One such program contains an application and an agent that operates under control of code executor 218 as described in one of the related applications. The agent retrieves from environment supply server 242 a list of available programs, and for each such program, a description thereof, and a link that enables the program to be downloaded. Each item on the list may be registered by developers or distributors of applications, along with the URL or other location on manifest server 244 from where the file 300 containing computer code may be located. The application displays the list and when the link is clicked, the agent retrieves the file containing the computer code as described above, and the installation process proceeds as described above, under the direction of that file. The file need not contain environment instruction set 310, because the environment is already installed. In one embodiment, instead of the file containing computer code, the URL in the list contains a URL to the manifest for the program in manifest server 244, and the agent provides code executor 218 with the instructions that would have been in the file 300 to start the installation of the program by retrieving the manifest, and continuing as described above.

The agent and application contain instructions for performing these functions and are stored in storage 222 and executed by code executor 218. In such embodiment, code executor 218 operates as the agent manager, consisting of a Flash player, modified as described in the related applications, and operating under the direction of its associated movie file, and application shell manager, consisting of a Flash player, modified as described in the related applications, and operating under the direction of its associated movie file, as described in the related applications.

Figure 4:
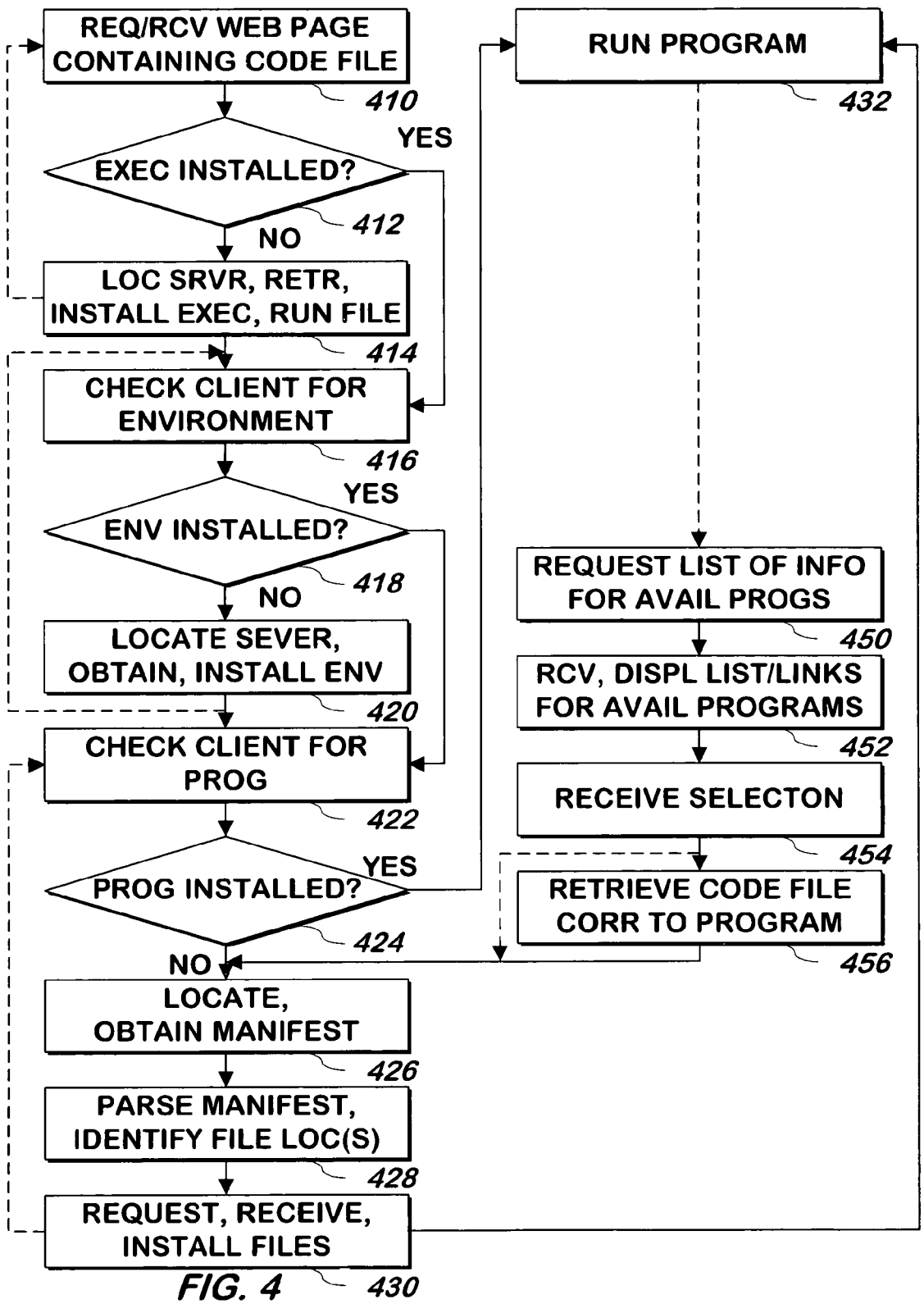
FIG. 4 is a flowchart illustrating a method of installing a computer program, and optionally, its environment according to one embodiment of the present invention.

FIG. 4 illustrates a method of installing a computer program and optionally, its environment according to one embodiment of the present invention. Referring now to FIG. 4, a web page is requested containing a code file corresponding to the computer program desired and the code file is received with the web page as described above 410. If a plug in or other means of executing (e.g. via a compiler or interpreter) the code in the code file is installed or otherwise residing on the computer system that received the response 412, the method continues at step 416 and otherwise 412, such a plug in or other means of executing the code file is identified (e.g. from the code file, or via a location stored by a browser for various types of files), retrieved and installed, and the code file retrieved is run using the plug in or other means of executing the code file 414, and the method continues at step 416, or the method is repeated at step 410 as indicated by the dashed line in the Figure.

Step 412 may involve checking an existing plug-in or other means of executing the code file for a version identifier that is at least as high as that specified in the code file, prompting the user to retrieve a newer version, and receiving assent from the user. Step 414 may involve retrieving a newer version of the plug in or other means of executing the code file, installing it, prompting the user to restart the browser or the computer system and restarting the browser or computer system, with the user beginning again at step 410, as indicated by the dashed line in the Figure, or the method continues at step 416.

At step 416, the computer system on which the program is to be installed (which may be the same computer system from which the request was generated in step 410) is checked to determine whether it has the proper environment to run the program as described above. If the computer system has the proper environment 418, the method continues at step 422 and otherwise 418, one or more servers that can be used to obtain the environment are identified, and the environment (or whatever portion may not reside on the computer system) is obtained over a network using the one or more servers as described above, and the environment (or such portion) is installed 420 and the method continues at step 422 in one embodiment, or step 416 in another embodiment illustrated by the dashed line in the Figure. Step 420 may include retrieving a file containing a user interface and instructions used to prompt the user to request permission to install the environment as described above, and/or a file containing the text of the prompts as described above. Step 420 may include receiving and installing one or more programs that are supplied with the environment, such as a program that performs steps 450-456 as described above.

At step 422, the client computer system onto which the program is to be installed is optionally checked to determine whether the program is already installed. If so 424, the program is run 432 and otherwise 424, a manifest describing the location of the one or more files that make up the program is located as described above and the manifest is obtained 426 over a network and the method continues at step 428. In one embodiment, no check is made to determine whether the program is already installed, and so steps 422 and 424 are not performed, and step 426 follows step 420 unconditionally.

The manifest is parsed to identify the one or more locations of the one or more files corresponding to the program 428. Some or all of the files described by the manifest are requested and received 430 over a network as described above and optionally installed. The program corresponding to the one or more files retrieved in step 428 is run 432 in one embodiment, although in another embodiment illustrated by the dashed line in the Figure, step 422 follows step 430 instead of step 432 directly following step 430.

Once the environment is installed, any of the installed programs may be run as described in step 432 and the related applications. In one embodiment, the program is a program that lists programs available for installation and allows the user to have them installed with a single click of a button. If such program is run as in step 432, a list of available programs is requested 450 from a server over a network. The programs may have been developed by various commercial entities, descriptions of which are stored in the server. The list of programs and details about the programs, such as its developer, any length of a free trial period, and the price of the program is received from the server and displayed to the user in a manner that allows the user to select a program from the list 452. A selection is received from the user 454 corresponding to one of the programs on the list. Step 426 (or 422 in one embodiment) may follow step 454, with the location of the manifest for each program being contained in the list, and the manifest (and its location) of the selected program being used in step 426. Alternatively, step 456 may be performed between steps 454 and either step 426 or step 422, with step 456 involving retrieving a file containing code as described above from a location specified for that program on the list received in step 452.

Figure 5:
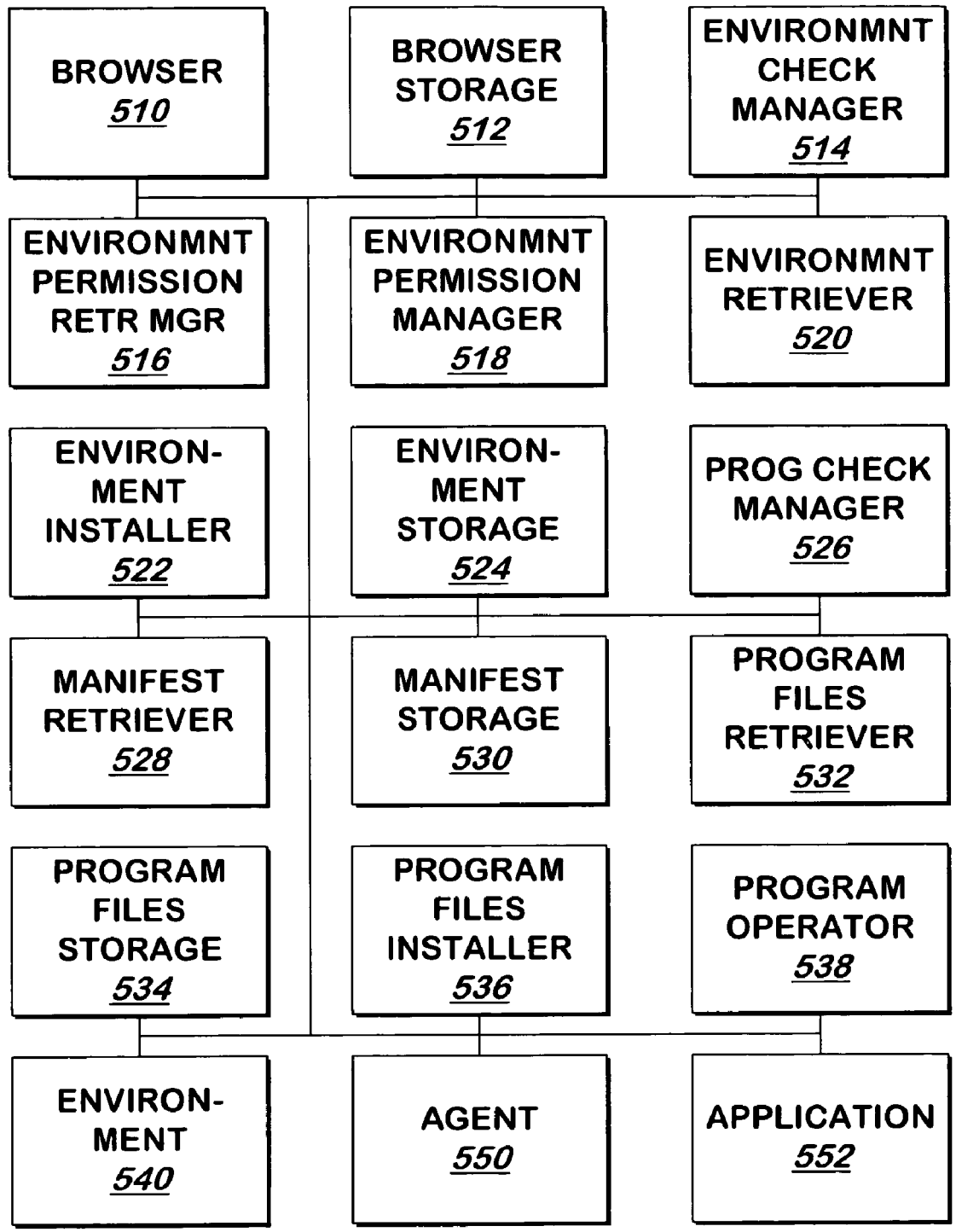
FIG. 5 is a block schematic diagram illustrating a system for obtaining and operating a computer program and optionally, its environment, according to one embodiment of the present invention.

Referring now to FIG. 5, a system for obtaining and operating a computer program and optionally, its environment, is shown according to one embodiment of the present invention, and is a different way of describing the system described with reference to FIGS. 2, 3A and 3B that performs the method of FIG. 4. Browser 510 operates as browser 216 described above. Browser 510 stores the web page into browser storage 512 as well as the specification of the environment and the location of the manifest, both from the code file. Browser 510 also downloads environment check manager 514, optional program check manager 526, manifest retriever 528, program files retriever 532, program files installer 536, and program operator 538 as part of the code file, and signals environment check manager 514. When signaled, environment check manager 514 identifies whether the client computer system on which browser 510 operates contains the proper environment for the computer program. If so, environment check manager 514 signals program check manager 524 in one embodiment, or manifest retriever 526 in another embodiment. If not, environment check manager 514 signals environment permission retriever manager 516.

Environment permission retriever manager 516 downloads environment permission manager 518, environment retriever 520 and environment installer 522 and signals environment permission manager 518. When signaled, environment permission manager 518 causes instructions to be provided to the user that some or all of the environment is required and prompts the user to install it. If the user responds in a manner that indicates that permission to install the environment is granted, environment permission manager 518 signals environment retriever 520, which retrieves the environment (and may also retrieve certain programs that appear to the user as preinstalled), stores it into environment storage 522, and signals environment installer 522, which installs the environment as environment 540 and installs any such preinstalled-appearing programs, such as agent 550 and application 552 and signals program check manager 526 or manifest retriever 528.

Optional program check manager 526, when signaled, attempts to locate in program files storage 534 the program having the name specified in browser storage 512 that was retrieved as part of the code file. If the program is located, program check manager 526 signals program operator 538 and otherwise signals manifest retriever 528.

When signaled, manifest retriever 528 retrieves the location of the manifest from browser storage 512, retrieves the manifest from that location, stores it into manifest storage and signals program files retriever 532. Program files retriever 532 retrieves the program files corresponding to the manifest, stores them into program files storage 534 and signals optional program files installer 536 in one embodiment, or program files operator 538 in another embodiment. When signaled, program files installer 536 installs the program files in program files storage 534, for example, by copying them or renaming them into another area of program files storage 534. Program files installer 536 signals program operator 538, which retrieves the name of the program from browser storage 512 or manifest storage 530 and runs the program, for example, by signaling environment 540 with the program name as described above. Program operator 538 may be part of environment 540.

Environment 540 may run any program, including the program that contains agent 550 that retrieves from a server the list of programs that can be installed, provides the list to an application 552, which displays it to the user, allows a selection to be made, and then provides the location of a file containing code to manifest retriever 528, to initiate the installation process of the program selected.

Some or all of elements 514-552 may make up code executor 218 of FIG. 2.

Exhibit A

I. Checking for Installation of an Environment (Macromedia Central) and Installing it if not Installed

```
centralProduct=new System.product("Central");
//check if central is already installed
if (centralProduct.isInstalled( ))
{
//yep, it is, launch it if it isn't already running, so we can install our app
If (!centralProduct.isRunning( ))
{
centralProduct.launch( );
}
}
else
{
centralProduct.download( );
//here we wait for status messages letting us know if the user cancels the Central install, or if it downloads completely.
//once download is complete, we can launch Central and continue with the Central application install.
}
```

Notes Regarding the Above Code:
Calling 'download' (the actionscript command System.product.download( )) executes Flash player code which brings up a dialog within the Flash movie, asking the user if they want to download Central.
In order to display this dialog, the Flash player first queries a cgi file on macromedia.com, supplying the name of the product and retrieving an xml file containing strings to display in the dialog. Eg:
query—
https://www.macromedia.com/bin/
flashdownload.cgi?product=central&what=descr returns—
https://www.macromedia.com/pub/central/core/Central-Download.xml
If the user ok's the install dialog, the Flash player queries the cgi file again, getting the file to download, based on the platform/OS.

II. Monitoring the Installation Process

During the install process, actionscript in our browser movie can poll periodically until the install is complete and Central is running.
Once that is done, we want to install our Central application. We create a LocalConnection object in our Flash movie, which is used to talk to a LocalConnection object in Central (LocalConnection is an actionscript object enabling communication between, say, two different Flash movies in different browser windows, or a Flash movie in a browser and one in the standalone player, etc. It basically works by a Flash player instance writing information into shared memory, and checking that memory on idle to see if any messages have written for it).
myLC=new LocalConnection( );
//call the localconnection function 'send( )'.
//Parameters are the name of the localconnection we want to send to—"macromedia.com:central"
//the method of that localconnection we want to call—"installService"
//the location of the product.xml file identifying our application
//and the name of a localconnection we have created to receive status messages about the install.
myLC.send("macromedia.com:central", "installService", productXMLUrl, statusConnection);

What is claimed is:

1. A method of installing a program, comprising:
receiving a request to install a program on a computer system;
in response to receiving the request, identifying whether a code executor is either located on the computer system or is a correct version for the program on the computer system;
responsive to an incorrect version of the code executor being stored on the computer system or the correct version not being located on the computer system, obtaining and downloading the code executor having the correct version to the computer system;
checking, by the code executor, the computer system for at least one version of an environment in which the program will run that is compatible with the program requested;
responsive to the checking step indicating that the computer system does not have at least one version of the environment in which the program will run that is compatible with the program requested, the code executor performing the steps of:
obtaining a version of the environment in which the program will run that is compatible with the program requested, wherein the obtaining comprises:
requesting and downloading one or more software environment components from a network server, and
ordering delivery of one or more hardware environment components, to be provided to a user of the computer system,
detecting that the version of the environment is obtained or installed on the computer system; and
installing in the environment the program requested.

2. The method of claim 1 wherein the code executor is a plug in to a browser.

3. The method of claim 1:
additionally comprising, identifying whether the program corresponding to the request is already installed on the computer system; and wherein the checking, obtaining a version of the environment, detecting and installing steps are responsive to the identifying whether the program is already installed step.

4. The method of claim 3, additionally comprising running the computer program responsive to identifying that the program corresponding to the request is already installed on the computer system.

5. The method of claim 1:
additionally comprising verifying that the version of the environment in which the program will run that is compatible with the program requested is installed on the computer system responsive to the detecting step; and
wherein the installing step is responsive to the verifying step.

6. A system for installing a program, comprising:
a browser having an input for receiving a request to install a program on a computer system and an output for signaling responsive to the request;
a code executor identifier configured to:
in response to receiving the request, identify whether a code executor is either located on the computer system or is a correct version for the program on the computer system, and
responsive to an incorrect version of the code executor being stored on the computer system or the correct version not being located on the computer system, obtain and download the code executor having the correct version to the computer system;
an environment check manager having an input coupled to the browser output, the environment check manager for checking the computer system, by the code executor, for at least one version of an environment in which the program will run that is compatible with the program requested, the environment check manager for, responsive to the checking step indicating that the computer system does not have at least one version of the environment in which the program will run that is compatible with the program requested, signaling at an output;
an environment provider having an input coupled to the environment check manager output, for, responsive to the signal received at an environment retriever input, obtaining a version of the environment in which the program will run that is compatible with the program requested, wherein the obtaining comprises:
requesting and downloading one or more software environment components from a network server, and
ordering delivery of one or more hardware environment components, to be provided to a user of the computer system,
for detecting that the version of the environment is obtained or installed on the computer system; and
for signaling at an output responsive to said environment being detected; and
a program files installer having an input coupled to the environment provider for receiving the signal at the environment provider output, the program files installer for installing in the environment the program requested responsive to the signal received at the program files installer input.

7. A computer program product comprising a computer useable medium having computer readable program code devices embodied therein for installing a program, the program code devices configured to cause a computer system to:
receive a request to install a program on a computer system;
in response to receiving the request, identify whether a code executor is either located on the computer system or is a correct version for the program on the computer system;
responsive to an incorrect version of the code executor being stored on the computer system or the correct version not being located on the computer system, obtain and download the code executor having the correct version to the computer system;
check, by the code executor, the computer system for at least one version of an environment in which the program will run that is compatible with the program requested;
responsive to the computer readable program code devices configured to cause the computer system to check, indicating indicate that the computer system does not have at least one version of the environment in which the program will run that is compatible with the program requested, the code executor configured to:
obtain a version of the environment in which the program will run that is compatible with the program requested, wherein the obtaining comprises:
requesting and downloading one or more software environment components from a network server, and
ordering delivery of one or more hardware environment components to be provided to a user of the computer system,
detect that the version of the environment is obtained or installed on the computer system; and
install in the environment the program requested.

8. The computer program product of claim 7 wherein the code executor is a plug in to a browser.

9. The computer program product of claim 7:
additionally comprising computer readable program code devices configured to cause the computer system to identify whether the program corresponding to the request is already installed on the computer system; and
wherein the computer readable program code devices configured to cause the computer system to check, obtain a version of the environment, detect and install steps are responsive to the computer readable program code devices configured to cause the computer system to identify whether the program is already installed.

10. The computer program product of claim 9, additionally comprising computer readable program code devices configured to cause the computer system to run the computer program responsive to identifying that the program corresponding to the request is already installed on the computer system.

11. The computer program product of claim 7:
additionally comprising computer readable program code devices configured to cause the computer system to verify that the version of the environment in which the program will run that is compatible with the program requested is installed on the computer system responsive to the detecting step; and
wherein the computer readable program code devices configured to cause the computer system to install are responsive to the computer readable program code devices configured to cause the computer system to verify.

12. The system of claim 11 wherein the code executor is a plug in to a browser.

13. The system of claim 6, additionally comprising:
a program identifier, the program identifier for identifying whether the program corresponding to the request is already installed on the computer system and signaling at an output responsive to the identifying; and wherein the environment check manager has an input coupled to the program identifier output for checking responsive to identifying whether the program is already installed, the environment provider has an input coupled to the program identifier output for obtaining a version of the environment and detecting responsive to the identifying whether the program is already installed, and the program files installer having an input coupled to the program identifier output for installing response to the identifying whether the program is already installed.

14. The system of claim 13, additionally comprising a program runner having an input coupled to the program identifier output for running, responsive to the program identifier signaling that the program corresponding to the request is already installed on the system to the output, the program corresponding to the resquest.

15. The system fo claim 6:
additionally comprising an environment version verifier having an input coupled to the environment provider output, the environment version verifier for verifiying the version of the environment in wich the program will run and for signaling at an output responsive to the verifying; and wherein the program files installer has an input coupled to the enviornment version verifier output and the installing is responsive to the signal received at the program files intstaller input.

\* \* \* \* \*

UNITED STATES PATENT AND TRADEMARK OFFICE
CERTIFICATE OF CORRECTION

| | |
|---|---|
| PATENT NO. | : 7,913,248 B1 |
| APPLICATION NO. | : 11/089699 |
| DATED | : March 22, 2011 |
| INVENTOR(S) | : Kevin Lynch et al. |

It is certified that error appears in the above-identified patent and that said Letters Patent is hereby corrected as shown below:

In Column 1 Approx at Line 6, below "RELATED APPLICATIONS", insert -- This application claims the benefit of U.S. provisional application Ser. No. 60/556,721 entitled, "Method and Apparatus for Communicating Information Over a Network" filed on Mar. 26, 2004 by Kevin Lynch, David Calaprice, Ethan Malasky and Tracy Stampfli; U.S. provisional application Ser. No. 60/556,595 entitled, "Method and Apparatus for Installing One or More Programs and At Least a Portion of Their Environment" filed on Mar. 26, 2004 by Kevin Lynch, Tracy Stampfli, Peter Grandmaison and Rebekah Hash; and U.S. provisional application Ser. No. 60/556,966 entitled, "Method and Apparatus for Updating One or More Programs and Their Environment" filed on Mar. 26, 2004 by Tracy Stampfli and Rebekah Hash, each having the same assignee as this application and each is incorporated herein by reference in its entirety. --.

In Claim 7 in Column 14 at Line 16-17, after "check," delete "indicating".
In Claim 14 in Column 16 at Line 2, delete "to" and insert -- at --, therefor.
In Claim 14 in Column 16 at Line 3, delete "resquest." and insert -- request. --, therefor.
In Claim 15 in Column 16 at Line 4, delete "fo" and insert -- of --, therefor.
In Claim 15 in Column 16 at Line 7, delete "verifiying" and insert -- verifying --, therefor.
In Claim 15 in Column 16 at Line 8, delete "wich" and insert -- which --, therefor.
In Claim 15 in Column 16 at Line 12, delete "enviornment" and insert -- environment --, therefor.
In Claim 15 in Column 16 at Line 14, delete "intstaller" and insert -- installer --, therefor.

Signed and Sealed this
Fourth Day of October, 2011

David J. Kappos
*Director of the United States Patent and Trademark Office*